US 6,561,456 B1

(12) United States Patent
Devine

(10) Patent No.: US 6,561,456 B1
(45) Date of Patent: May 13, 2003

(54) VERTICAL/SHORT TAKE-OFF AND LANDING AIRCRAFT

(75) Inventor: Michael Thomas Devine, 601 W. 57th St., Kansas City, MO (US) 64113

(73) Assignee: Michael Thomas Devine, Kansas City, MO (US)

( * ) Notice: Subject to any disclaimer, the term of this patent is extended or adjusted under 35 U.S.C. 154(b) by 0 days.

(21) Appl. No.: 10/010,649

(22) Filed: Dec. 6, 2001

(51) Int. Cl.$^7$ ............................................... B64C 29/00
(52) U.S. Cl. ................... 244/12.1; 244/12.3; 244/23 B; 244/23 C; 244/45 A
(58) Field of Search .................. 244/4 A, 12.2, 244/23 C, 34 A, 23 D, 12.3, 12.1, 23 B, 45 A, 207; 416/161, 142, 143, 135; 60/242

(56) References Cited

U.S. PATENT DOCUMENTS

| | | | |
|---|---|---|---|
| 3,335,960 A | * | 8/1967 | Alderson |
| 3,912,201 A | * | 10/1975 | Bradbury |
| 3,972,490 A | * | 8/1976 | Zimmermann et al. |
| 4,469,294 A | * | 9/1984 | Clifton |
| 4,674,709 A | * | 6/1987 | Welles |
| 4,828,203 A | | 5/1989 | Clifton et al. |
| 4,880,071 A | * | 11/1989 | Tracy |
| 4,896,846 A | * | 1/1990 | Strom |
| 5,295,643 A | * | 3/1994 | Ebbert et al. |
| 5,454,531 A | * | 10/1995 | Melkuti |
| 5,769,317 A | * | 6/1998 | Sokhey et al. |

FOREIGN PATENT DOCUMENTS

| | | | | |
|---|---|---|---|---|
| DE | 2736120 | * | 8/1977 | ................ 244/12.3 |

OTHER PUBLICATIONS

Notice to PM Readers, p. 1.

* cited by examiner

Primary Examiner—Tien Dinh
(74) Attorney, Agent, or Firm—Shook, Hardy & Bacon LLP

(57) ABSTRACT

An aircraft is provided having a fuselage and a pair of main wings. Each main wing includes a lift fan segment, a generally circular duct defined within the lift fan segment and a fan mounted within the duct. A tip extender is coupled with the tip of at least one of the fan blades and contacts the duct sidewall so that flow leakage of air between the tip of the fan and duct sidewall is reduced and the thrust efficiency increased. In another aspect of the invention, an elongated duct extender is coupled with the wings of the aircraft. When extended, the effective depth of the duct is increased to improve thrust efficiency. In another aspect of the invention, a number of outlet control vanes are located over the outlet of the duct. The outlet control vanes located near the center of the duct are operable independently of the remainder of the outlet control vanes to limit airflow through the center of the duct and prevent the inducement of a vortex ring state. In another aspect of the invention, a pitch control assembly is provided that includes a pair of pitch control fans and a pair of canard wings.

25 Claims, 4 Drawing Sheets

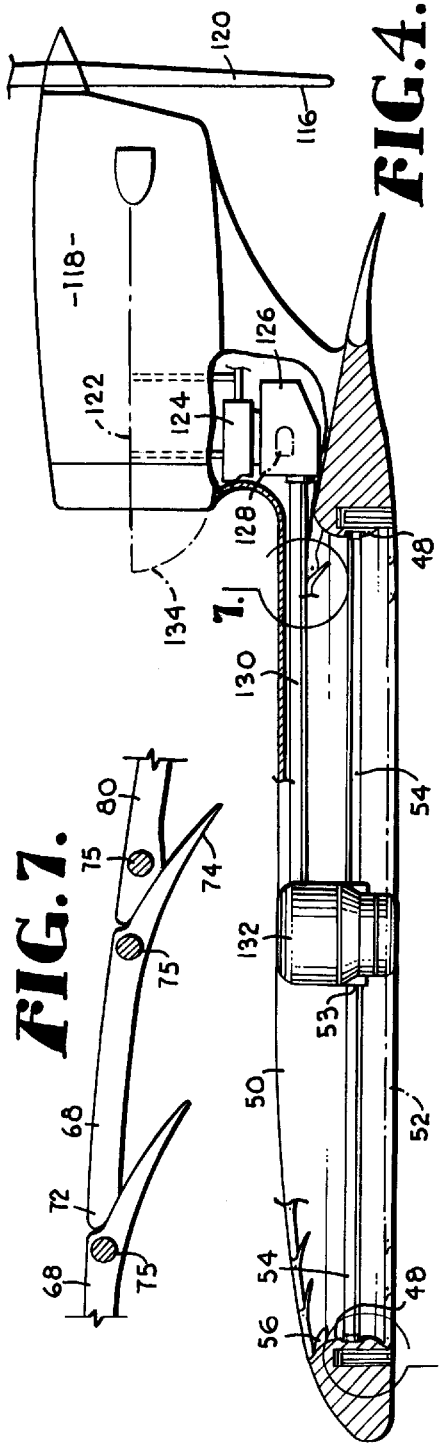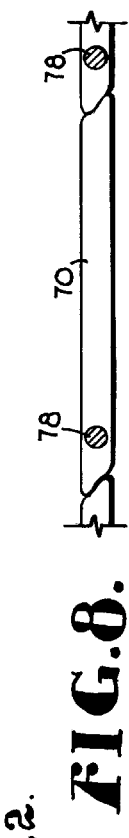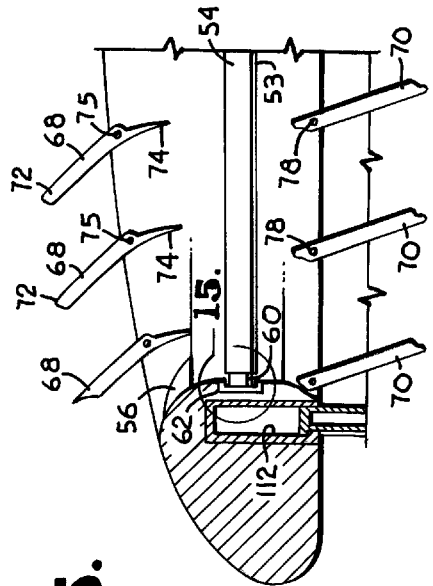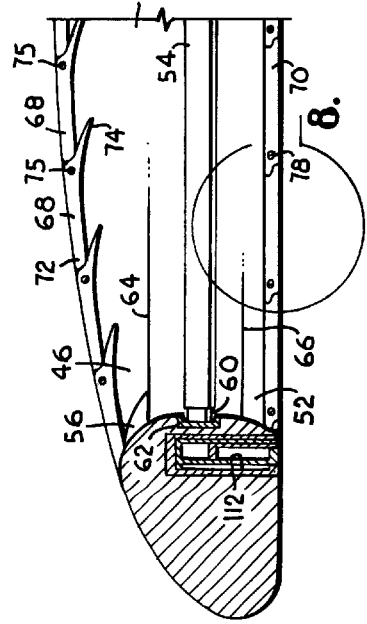

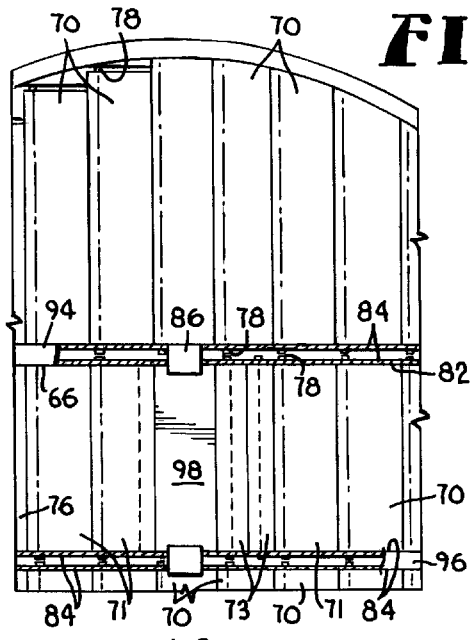
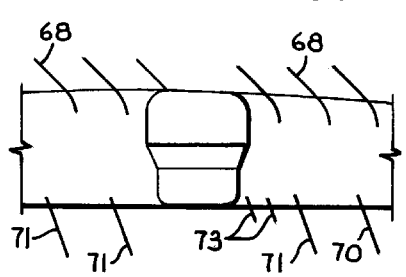
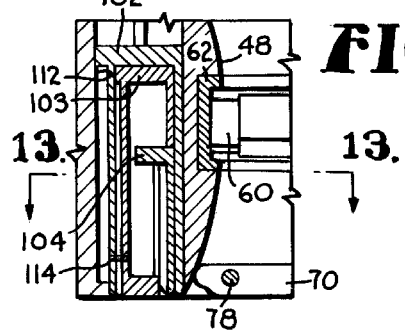
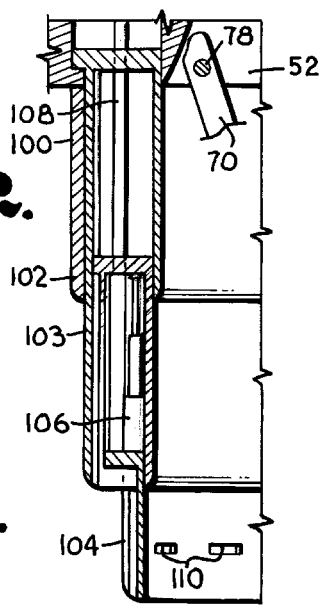
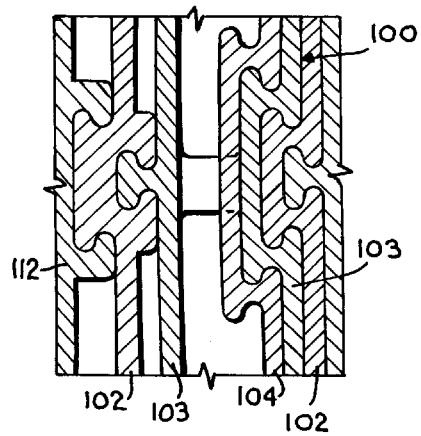
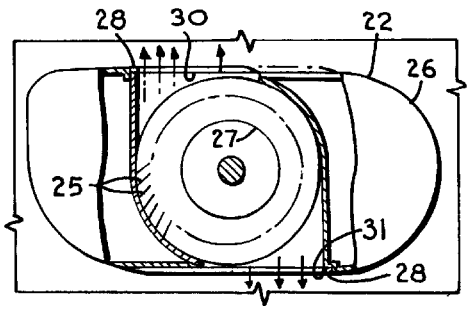

VERTICAL/SHORT TAKE-OFF AND LANDING AIRCRAFT

CROSS-REFERENCE TO RELATED APPLICATIONS

"Not Applicable"

STATEMENT REGARDING FEDERALLY SPONSORED RESEARCH OR DEVELOPMENT

"Not Applicable"

BACKGROUND OF THE INVENTION

The present invention relates to a vertical and short take-off and landing aircraft (V/STOL), and more particularly, the present invention relates to a V/STOL aircraft having ducted fans located in the aircraft's wings that cooperate with the duct wall to provide improved vertical thrust to lift and hover aircraft.

As set forth in U.S. Pat. No. 4,828,203 to Robert T. Clifton and Woodrow L. Cook, current aircraft are generically divided into two major classes, fixed wing and rotary airfoil. The former are typically referred to as "airplanes" and derive their lift from the forward motion of the aircraft, causing air to pass over an airfoil. Rotary winged aircraft, commonly referred to as "helicopters," have a prime mover attached to an airfoil which rotates.

The most successful V/STOL to date has been the helicopter. In addition to the prime mover, stub wings are sometimes added to produce lift at forward speeds. In hovering, however, the down wash of the rotor produces large loads on the wings, and compromises hovering performance. Another successful example of a V/STOL aircraft is the British Harrier military aircraft, which can rise vertically, and subsequently achieve supersonic speed in level flight. This is accomplished by running the aircraft's jet engines in a horizontal position and deflecting the jet blast downwardly to effect vertical thrust for take-off.

Several V/STOL alternatives have been constructed and tested. In one alternative, the entire airplane is tilted. One example of a tilted aircraft is the Convair XFY-1 "Pogo" which operates by tilting the power plant and wings in combination with one another. In another example, the Bell X-22, four tilting ducted propellers are utilized with a conventional stub wing mounted aft of the center of gravity. Another example is the Canadair CL-84 which features two prop-rotor engines mounted to a set of tilting wings. The current Bell-Boeing V-22 Osprey utilizes large powerplants pivoting on the wing ends of the "tilt-rotor" configuration. One problem with tilt-rotors involves stability control difficulties. Particularly, turbulent rotational flow on the prop-rotor blades may occur in descent and cause a vortex-ring state. The vortex-ring state causes unsteady shifting of the flow along the blade span, and may lead to roughness and loss of aircraft control. Also, the prop-rotors have a large diameter and may strike the landing surface when the engines are tilted fully forward. Current examples of V/STOL aircraft tested include the Boeing X-32B and Lockhead Martin X-35B. The Boeing X-32B utilizes turbo-jet engines with mid-fuselage lift nozzles, and the Lockhead Martin X-35B utilizes a separate lift fan driven by a drive shaft and clutch mounted on the prime mover. The U.S. Department of Defense selected the Lockhead Martin X-35B to serve as the military joint strike fighter.

Again, as set forth in U.S. Pat. No. 4,828,203 to Robert T. Clifton and Woodrow L. Cook, a number of common problems are associated with the currently known direct-lift aircraft. One problem is the detrimental effect of the high energy slip stream striking the ground. Loose material thrown about the aircraft constitutes a potential hazard to both the aircraft and to personnel in the vicinity of the aircraft. Another problem is the inadequate pitch control while in the hovering mode because of insufficient airflow over conventional control surfaces. A problem of the fan-in-wing aircraft is that the relative thin wings limit the depth of the fan duct and the vertical thrust produced by the fans.

The aircraft disclosed in the aforementioned U.S. Pat. No. 4,828,203 solves some of these problems. However, the aircraft disclosed in the patent generates a limited amount of thrust since air tends to leak (or flow) between the tips of the fan blades and the fan duct walls. Additionally, a lack of duct depth limits the amount of thrust that can be generated. In order to have sufficient depth to create the desired thrust efficiently, a relatively thick wing is needed. Moreover, the aircraft lacks the pitch control desired when the prime mover of the aircraft becomes inoperative and insufficient airflow moves across the canards and/or control surfaces mounted behind propeller. Also, during descent, the flow of air through the center of the fan duct may be too great, and induce a vortex state that causes a downward flow and pushes the aircraft rapidly and uncontrollably toward the ground. These and other problems are solved by the invention described below.

BRIEF SUMMARY OF THE INVENTION

It is an object of the invention to provide a safer, more reliable and stable V/STOL aircraft.

It is another object of the invention to provide an aircraft which can land and take off in either conventional lift wing mode or lift fan mode.

Yet another object of the invention is to provide an aircraft allowing greater and more efficient airflow through the lift fan ducts, especially at vertical take off or landing.

Another object of the invention is to provide a lift improvement device which generates more effective airflow at the ducted fan blade tips.

Still another object is to provide an aircraft that resists or eliminates the undesirable vortex ring state effect.

Another object of the invention is to provide improved fan lifting performance by increasing the depth of the ducts with controllable duct extenders and other features.

Another object of the invention is to provide an aircraft having pitch control devices powered independently of the prime mover power, and allowing pitch control with separate pitch control fans without assistance from prime mover.

In accordance with these and other objects evident from the following description of a preferred embodiment of the invention, an aircraft is provided having a fuselage and a pair of main wings. Each main wing includes a lift fan segment, a generally circular duct defined within the lift fan segment and a fan mounted within the duct. A tip extender is coupled with the tip of at least one of the fan blades and contacts the duct sidewall so that leakage of air between the tip of the fan and duct sidewall is reduced and thrust efficiency increased.

In accordance with another aspect of the present invention, a fan-in-wing aircraft is provided that includes a duct extender located about the duct in the wing. The elongated duct extender is coupled with the lift fan segment of the wing and is capable of extension relative to the lift fan segment. When extended, the duct depth is increased causing air drawn through the duct and duct extenders to provide improved thrust of the lift fan segment.

In accordance with another aspect of the invention, a fan-in-wing aircraft is provided having a number of inlet control vanes pivotally coupled with the lift fan segment about the inlet of the duct, and a number of outlet control vanes pivotally coupled with the lift fan segment about the outlet of the duct. The outlet control vanes located near the center of the duct are operable independently of the remainder of the outlet control vanes to limit airflow through the center of the duct and prevent the inducement of a vortex ring state.

In yet another aspect of the invention, a fan-in-wing aircraft is provided having a pitch control assembly located forward of the center of gravity of the aircraft. The assembly includes a pair of canard wings disposed generally symmetrically about the fuselage and a pair of pitch control fans located proximate the canard wings. The flow of air over the canard wings or through one of a pair of outlets in each of the pitch control fans assists in controlling the pitch of the aircraft.

BRIEF DESCRIPTION OF THE SEVERAL VIEWS OF THE DRAWING

FIG. 4 is an fragmentary sectional view of the aircraft taken along line 4—4 of FIG. 1;

FIG. 5 is an enlarged, fragmentary sectional view of the lift fan segment with the inlet and outlet control vanes in the closed position;

FIG. 6 is an enlarged, fragmentary sectional view of the lift fan assembly of FIG. 5 with the inlet and outlet control vanes in an open position;

FIG. 7 is an enlarged view of the area encompassed by the circle designated by the numeral 7 in FIG. 4;

FIG. 8 is an enlarged view of the area encompassed by the circle designated by the numeral 8 in FIG. 5;

FIG. 9 is a fragmentary bottom plan view of the ducted wing segment with parts of the lower structural enclosure broken away to better illustrate outlet control vanes and control system of the present invention;

FIG. 10 is a fragmentary schematic side elevational view of the lift fan segment with parts broken away to illustrate the hub of the a duct wall fan and illustrating the inlet and outlet control vanes in the fully open position;

FIG. 11 is an enlarged, fragmentary sectional view of the duct extenders of FIG. 3 in the deployed position;

FIG. 12 is an enlarged, fragmentary sectional view of the duct extenders of FIG. 3, but the duct extenders are in the retracted position;

FIG. 13 is a fragmentary, sectional view taken along line 13—13 of FIG. 12 illustrating the nestling rings of duct extenders;

FIG. 14 is a fragmentary, sectional view of a pitch control fan taken along line 14—14 of FIG. 1;

DETAILED DESCRIPTION OF THE INVENTION

Figure 1:
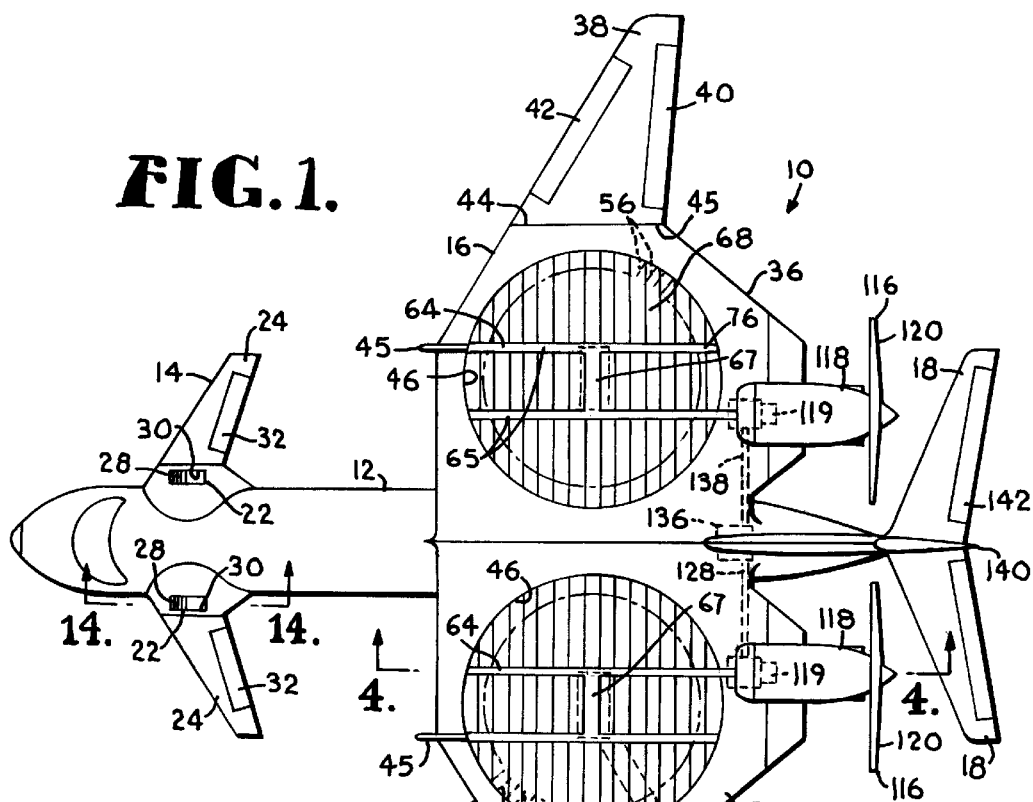
FIG. 1 is a top plan view of an aircraft constructed in accordance with the preferred embodiment of the present invention.

With initial reference to FIG. 1, a V/STOL aircraft constructed in accordance with the preferred embodiment of the present invention is shown and designated generally by numeral 10. The aircraft 10 includes a fuselage 12, a pitch control assembly 14, a pair of main wings 16 and a pair of stabilizers 18 disposed on either side of a vertical fin 20. In a preferred embodiment of the invention described herein, a passenger aircraft and crew of 28–35 people is typical. However, the assemblies of the present invention have application for aircraft of various sizes.

Figure 2:
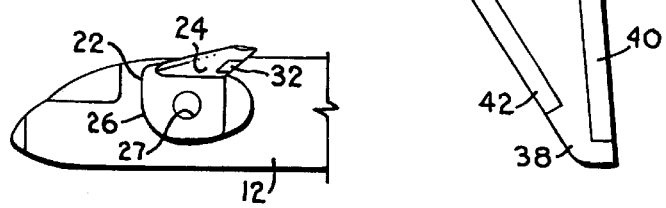
FIG. 2 is fragmentary elevational view of the aircraft of FIG. 1 illustrating the pitch control assembly of the present invention.

The pitch control assembly 14 is disposed forward of the center of gravity of the aircraft, and includes a pair of pitch control fans 22 and a pair of canard wings 24 located symmetrically about the fuselage 12. As illustrated in FIG. 14, each pitch control fan 22 is preferably a centrifugal caged fan having a number of fan blades 25, a fan housing 26 and a pair of covers 28. The covers 28 selectively cover one of a pair of discharge openings 30 and 31 in the housing. When the aircraft is horizontal relative to the ground, discharge opening 30 is directed upwardly and discharge opening 31 is directed downwardly. The fan 22 receives air through an air intake opening 27 (also shown in FIG. 2) in the housing. Each cover 28 allows airflow through one of the discharge openings 30 and 31 in the fan housing 26 to provide upward or downward thrust to provide pitch control to aircraft 10 in stationary or forward flight. The operable covers 28 can be opened or closed to seal the top or bottom openings to achieve desired thrust direction. Both covers are closed when the fans are not operating to provide minimum resistance to airflow about the surface of the fans when the aircraft is in forward flight.

The fans 22 are driven by electric motors energized by a redundant system of electric generators attached to each prime mover of the aircraft as described below. The electric motors have sufficient horsepower to turn the fan blades 25 for an equal degree of pitch control as the control provided by the canard wings when the aircraft is in forward flight. A standby battery pack (not shown) with an electric trickle charger is connected to each pitch control fan 22 and is enclosed in the housing of the pitch control assembly. The control assemblies are not shown and may take the form of any of a number of controls known to those of ordinary skill in the art.

As illustrated in FIG. 1, canard wings 24 are disposed symmetrically on opposite sides of the pitch control fans 22. Each canard wing includes an elevator member 32 that is pivotally attached to the canard. Suitable controls are provided to the operator of the aircraft for operating pitch control fans and positioning the elevators of canard to control the pitch of aircraft. Pitch control assembly 14 provides a downwardly or upwardly directed force, and nose-down or nose-up movement of the aircraft, whether aircraft is in vertical lift, descent, hover mode, or in forward flight. Namely, the canard wings provide control of aircraft stall since they are designed to stall before the main wings stall, thereby producing an aircraft nose-down condition while the main wings and stabilizers remain effective. This nose-down movement, which changes the canard wing angle of attack, allows the canard wing to resume its lift and avoid aircraft stall. Both the elevator members on the canard wings 24 and pitch control fans 22 can be used concurrently while in forward flight to control the pitch of the aircraft if operator desires. Also, the pitch control fans 22 can be employed to initiate rapid recovery from a stall or prevent severe loss of pitch control when canard wings 24 and prime movers (described below) cannot prevent the stall, and canard wings 24 do not provide sufficient pitch or stall control.

Figure 3:
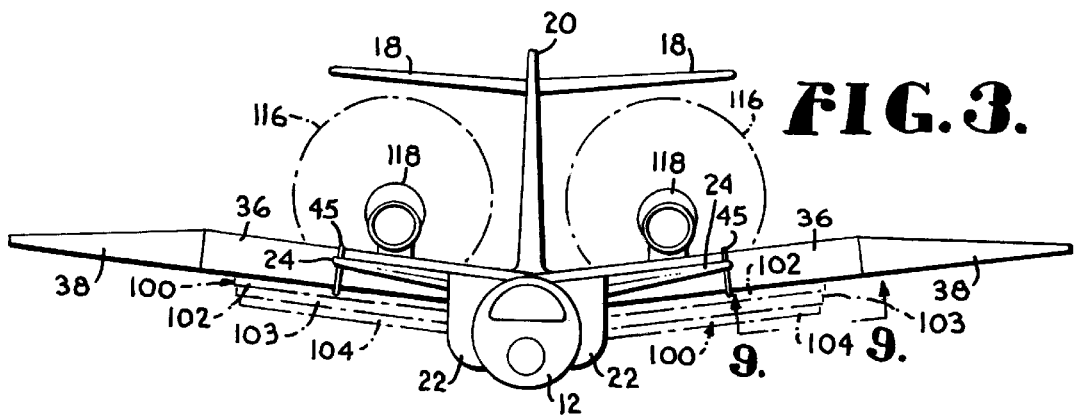
FIG. 3 is a front elevational view of the aircraft of FIG. 1 with phantom lines illustrating the duct extenders in the fully deployed position.

The main wings 16 are attached symmetrically on opposite sides of the fuselage 12. Each main wing 16 includes a ducted lift fan segment 36 and a pair of lift wing segments (or wings) 38. Each wing 38 has an elevator (or aileron) 40 and a leading edge flap 42. Lift wings 38 and canard wings 24 provide aerodynamic lift sufficient for forward flight without supplemental lift provided by ducted lift fan segments 36. However, this invention allows lift fan segments 36 to optionally provide supplemental lift in conventional main wing lift take-off or landing mode. Lift wings 38 pivot up and back toward ducted lift fan segment at a hinge 44 for reduced aircraft storage area. As illustrated in FIGS. 1 and 3, a flow fence 45 is mounted to main wing at conjunction of ducted lift fan segment 36 and lift wing segment 38 at or near the hinge 44.

As illustrated in FIG. 1, the ducted lift fan segments 36 are mounted generally about the center of gravity of the aircraft. A generally circular duct 46 extends through each ducted lift fan segment 36. As illustrated in FIG. 4, a duct sidewall 48 is located within the wing, and defines an upper inlet 50 and a lower outlet 52. A lift fan 53 having a number of blades 54 rotate within the space defined by the duct sidewall 48. As illustrated in FIG. 5, a number of duct wall fins 56 are disposed near the inlet 50 on the duct sidewall 48. Duct wall fins 56 have the shape of an airfoil and are affixed about the circumference of the duct as illustrated in FIG. 1. Duct wall fins 56 are preferably constructed of a strong rigid lightweight material such as a rigid foam sandwich of epoxy suitable for fusing or bonding to duct sidewalls. Alternatively, the duct wall fins may be constructed of a lightweight metal and mechanically secured to the duct sidewall. Duct wall fins 56 direct incoming air from the edges of the upper inlet 50 and distribute air uniformly across the tips of the fan blades to increase the effective thrust of the blades.

Figure 15:
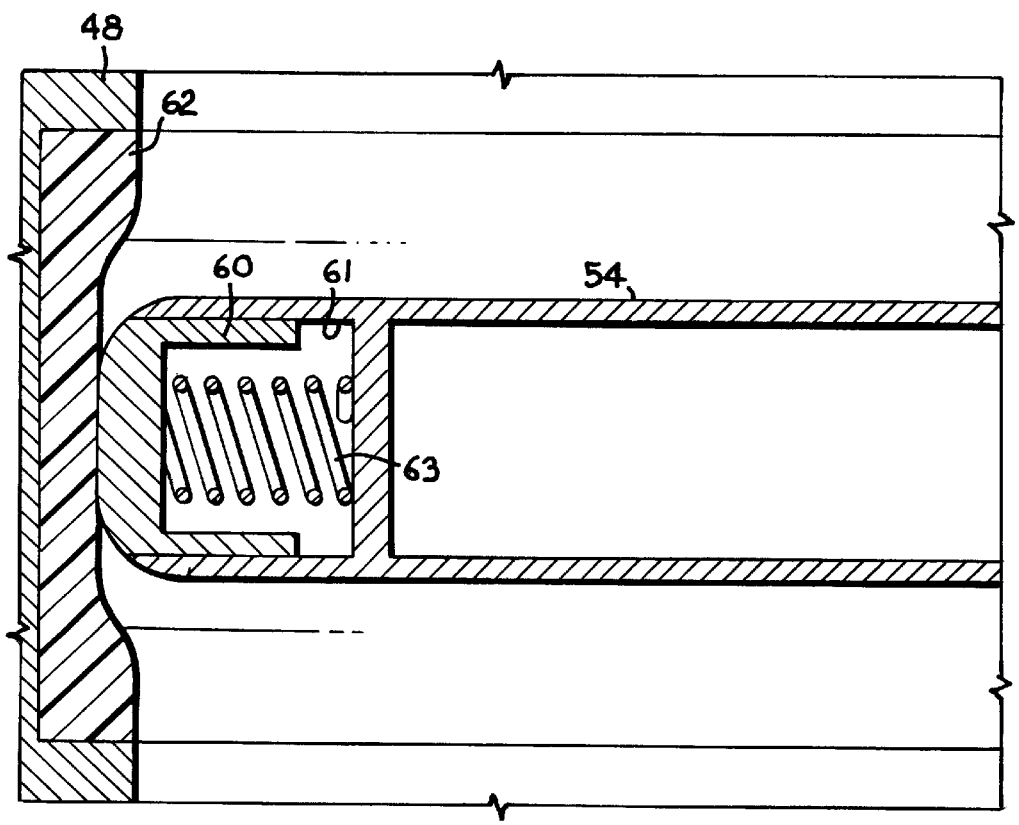
FIG. 15 is an enlarged, fragmentary sectional view of the area encompassed by the circle designated as numeral 15 in FIG. 6.

As illustrated in FIG. 5, a tip extender 60 is enclosed within the tip of each fan blade 54. As illustrated in FIG. 15, tip extender 60 is located within a cavity 61 defined within the tip of each fan blade 54, and is generally flush with the interior sidewalls of the cavity. Preferably, the outer surface of tip extender 60 is biased toward a contact surface 62 on duct sidewall 48 by a spring 63. Spring 63 is typically secured to the underside of the tip extender on one end and a fixed point at the base of the cavity 61 on the opposing end. The spring applies a relatively small amount of force to maintain the tip extender 60 in contact with the contact surface 62. The contact surface 62 is embedded about the circumference of the duct sidewall 48, and is slightly indented along the ring at which the tip extender or tip extender 62 contact the sidewall. Preferably, the tip extender is made of titanium, and contact surface is made of a rub material such as a soft honeycomb. Alternatively, the tip extenders may be made from a rub material and the contact surface made of titanium or another metal having similar properties.

When the fan blades are rotating, the tip extenders 60 are further forced in the direction of the sidewall 44 under the centrifugal forces acting on the tip extenders. The tip extenders 60 move into contact with the contact surface 62, and remain in contact during blade rotation. A limiter spring (not shown) may be utilized to limit the amount of outward force on the tip extenders so that the friction between the tip extenders and the contact surface is not too great.

Contact surfaces 62 wears by friction with the tip extender 60, and forms a seat and seal that generally prevents air movement or leakage between tip extenders 60 and duct sidewall 48. With reference to FIG. 4, the duct wall fins 56 direct air to the tip extenders and the fan blade tips at the greatest distance from the fan hub 132 so that a greater amount of lift is achieved at the outer portions of the fan blades. The tip extenders increase the effective length of the fan blades, and reduce the amount of air or flow leakage that occurs between the fan blade tip and the duct wall.

Figure 16:
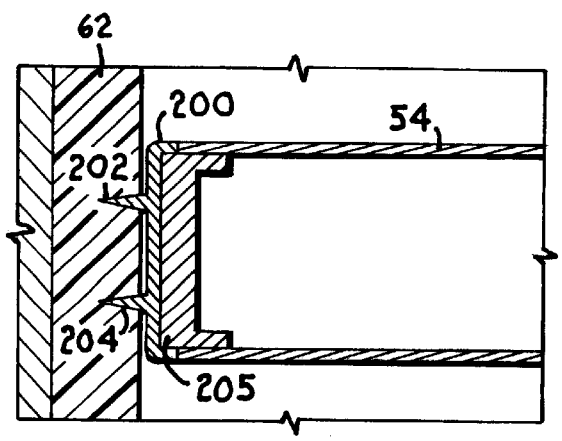
FIG. 16 is an enlarged, fragmentary view of an alternative embodiment of a tip extender and contact surface.

Alternatively, the tip extenders may be held at a small distance from the duct sidewalls by a spring, and forced into contact with the contact surface under the centrifugal forces during fan rotation. With reference to FIG. 16, in another alternative, a lightweight fan blade tip 200 having a pair of protruding ridges 202 and 204 is employed. Ridges 202 and 204 terminate in sharp edges that cut within the contact surface to form a labyrinth seal between the tips and the duct sidewalls. A shroud 205 is affixed to the blades to prevent blade deflection and to secure the fan blade tip 200 to the blades.

As illustrated in FIG. 5, the lift fan is framed by an upper structural enclosure 64 and a lower structural enclosure 66. The enclosures are preferably formed of structural tubes or built-up members. As illustrated in FIG. 1, the members of the upper structural enclosure are joined with a lateral plate 67 extending therebetween to support and cover the lift fan hub.

A vane system controls the flow of air through the duct. Specifically, a number of inlet control vanes 68 are pivotally mounted at the upper inlet of the duct between the duct sidewall 48 and one of the members of the upper structural enclosure 64, or between two members of the upper structural enclosure. Inlet control vanes are controllably movable to variable positions between a completely closed position and a 90° open position. As described below and illustrated in FIG. 9, a number of outlet control vanes 70 and 71 are pivotally mounted at the lower outlet of the duct between the duct sidewall 48 and one of the members of the lower structural enclosure 66, or between two members of the lower structural enclosure.

As illustrated in FIG. 7, the inlet control vanes 68 include a leading edge 72 and a pronounced arcuate trailing edge 74, and pivot about a pinned shaft 75 located between the leading edge and trailing edge. The inlet control vanes 68 are aerodynamically shaped to provide inlet airflow control through the duct inlet proportional to the extent that the vanes are open. Arcuate trailing edge 74 directs air uniformly onto the blades 54 of the lift fan 53 when the inlet control vanes 68 are open as illustrated in FIG. 6.

As illustrated in FIG. 7, when the inlet control vanes 68 are in a closed position, the inlet control vanes mesh and fit flush with adjacent inlet control vane at the location where vane arcuate trailing edge 74 springs from adjacent vane. In this closed position, airflow is restricted from entering circular ducts. An aft-most inlet control vane 80 is coupled with coordinator hardware coupled with the pinned shaft associated with the vane. Inlet control vane 80 is held in position until the adjacent forward vane is sufficiently open to allow clearance for aft-most vane 80. When the inlet control vanes are closed over the duct, the upper surface of the ducted lift fan segment mimics the natural laminar flow profile so that the main wings provide the desired supplemental thrust when the aircraft is in forward flight.

As illustrated in FIG. 1, an inlet vane control assembly 76 controls the extent to which the inlet vanes are open and contained with the enclosure. The inlet vane control assembly is contained within and about the members of the upper structural enclosure 64 and operated similarly to the outlet control vane assembly described in detail below, except inlet control vane assembly does not have the counter-vortex-ring system of the outlet control vane assembly.

As illustrated in FIG. 9 and described more fully below, a number of peripheral outlet control vanes 70 and a number of central outlet control vanes 71 and 73. As illustrated in FIG. 6, the peripheral outlet control vanes 70 are pivotally mounted at a number of pinned shafts 78. The peripheral outlet control vanes 70 (and central control vanes 71 shown in FIG. 9 and 10) are larger and fewer in number than the inlet control vanes 68 and thereby create less airflow restriction from inlet to outlet to allow effective airflow and thrust through the duct. The outlet control vanes are controllably movable to variable positions between a completely closed position and an open position at which the outlet control vanes are approximately 150 degrees outward from closed position.

As illustrated in FIG. 9, an outlet vane control assembly 82 for controlling the position of the outlet control vanes includes a number of longitudinal control arms 84 coupled with and operated by a number of control boxes 86. The control boxes 86 are mounted to the members of the lower structural enclosure 66.

The central outlet control vanes 71 and 73 are located near the center of the duct. On one side of the central outlet control vanes, the peripheral outlet control vanes are pinned between the duct sidewall 48 and a member 94 of the lower structural enclosure 66. On the other side, the peripheral outlet control vanes 70 are pinned between the duct sidewall (not shown) and a second member 96 of the lower structural enclosure 66. On the remaining two sides of the central outlet control vanes, the peripheral outlet control vanes 70 are pinned between the members 94 and 96. The central outlet control vanes 71 and 73 are also pinned between the members 94 and 96, and define a rectangular section located about the center of the lift fan at which the fan blades originate. A lateral plate 98 is affixed between members 94 and 96 to support and cover lift fan hub. With additional reference to FIG. 10, in a preferred embodiment, the central outlet control vanes 73 are located on one side of the lateral plate 98 and are about half the size of the other outlet control vanes 71.

The rotational position of shafts 78 of the outlet control vanes is controlled by the longitudinal control arms 84 extending from the control boxes 86. The activator mechanisms for the outlet and inlet control vane control boxes have not been shown because they are well known in the art, and are preferably either electrical or hydraulic.

As illustrated in FIG. 6, the peripheral outlet control vanes 70 are in an open position which causes forward movement of the lift fan 53. In an open position from about 91° to 150°, outlet control vanes cause reverse or rearward movement of the lift fan. This controllability of outlet control vanes from closed position to most open position is important to the maneuverability of the aircraft while hovering. Specifically, the outlet control vanes provide forward thrust when they are open to about 89° and rearward thrust when open beyond 90°. Aircraft can therefore move forward or rearward while hovering, or can rotate about the vertical axis of the aircraft when the outlet control vanes are in forward thrust position on one ducted lift fan and in rearward thrust position in the other ducted lift fan.

As illustrated in FIG. 8, when the peripheral outlet control vanes 70 (and central outlet control vanes) are in the completely closed position, each of the vanes mesh and fit flush with adjacent vanes. In this closed position, airflow is restricted from entering duct. Vanes are flat and to not have an airfoil shape similar to inlet control vanes. The trailing edges of the outlet vanes are profiled for minimum restriction of outlet airflow when vanes are open.

The central outlet control vanes 71 and 73 are operated independently of the peripheral outlet control vanes 70 to counter the vortex-ring effect when aircraft is in a rapid vertical descent and peripheral outlet control vanes 70 and inlet control vanes 68 are in an open position. In previous V/STOL aircraft, this condition induces upward air flow at the inner portion of the lift fan blades and causes an undesirable second vortex to overcome the first vortex downflow produced by lift fan blade rotation. The central outlet control vanes 71 and 73 of the present invention can be closed independently of the peripheral outlet control vanes 70 to cause the majority of airflow, of which a large portion of airflow would otherwise be induced to flow through the inner portion of the lift fan blades producing the undesirable second vortex, to be directed away from the inner portion of the rotating fan blades to the outer portions of the fan blades, creating a more powerful first vortex and stable control of aircraft.

As illustrated in FIG. 11, an operable duct extender 100 is disposed about the lower outlet 52 of either duct. Each extender increases the effective depth of the duct to beyond the lower surface of the ducted fan segment, and increase the amount of direct thrust through the ducted fan segment. Each duct extender 100 includes a number of nestling rings 102–104. The nestling rings are variably controlled so that the duct extender can be set at any position between fully deployed or retracted. Each ring is preferably made of a strong lightweight material such as graphite fabric or rigid foam sandwich of epoxy. When fully extended, the nestlings rings of the duct extender 100 increase the effective duct depth by approximately 220% to 260%, or on the order of 0.25 to 0.35 of the diameter of the lift fan, to significantly increase the thrust capacity of the lift fans. The lowest ring 104 is coupled with a separate hydraulic tube 106 for retracting and deploying rings. The other rings 102 and 103 are operated by a separate mutual hydraulic system 108.

Lowest nestling ring 104 includes a number of slots 110 at the outboard section of the ring which allows outlet airflow to exit through the slots and away from bottom of aircraft when in a ground-effects state. The slots here reduce "suck-down" of the aircraft and direct air-borne particles and debris away from the fuselage area. As illustrated in FIG. 3, the ducted lift fan segments are oriented with respect to aircraft horizontal axis at a positive dihedral angle α of between 6 and 8 degrees. The nestling rings 102–104 are mounted in the ducted lift fan segment 36 conforming to the dihedral orientation of the main wings and therefore direct outlet airstream away from the fuselage 12 when in ground-effects state.

As illustrated in FIG. 12, the nestling rings 102–104 of the duct extender 100 are fully retracted in a duct extender housing 112 contained in the lower portion of duct lift fan segment. The nestling rings form a tight seal at lower surface of wing adjacent to the duct outlet 52 when retracted. Hydraulic system components for deploying and retracting extender rings are generally located within duct extender assembly. These hydraulic system lift points are located about the perimeter of the duct. A number of operable locking pins 114 are provided at the lift points to prevent duct extender 100 from being deployed without positive control selection by operator.

As illustrated in FIG. 13, the nestling rings 102–104 are interlocked as a unit. Illustrated is duct extender housing 112, highest ring 102, intermediate ring 103 and lowest duct extender ring 104. Turning to the power systems of the vehicle as illustrated in FIG. 1, a pair of prime movers 116 are attached to the main wing assemblies 16. Each mover 116 includes a gas turbine turboprop engine 118 having a pusher propellers 120 for forward flight. A drive train 119 is coupled between the engine 118 and the lift fans 53. Each turboprop engine 118 should be capable of generating in the range of 5,500 to 6,500 SHP. Such turboprops are normal in the industry and include Allison T406-AD-400, Rolls-Royce Tyne R TY.20MK.21/22 and Rolls-Royce AE 1107C. These engines can supply power to the drive train 119 adequate to rotate lift fans so that each generate 20,000–23,000 pounds of thrust.

As illustrated in FIG. 4, a driving gear set 122 engages the turbine engine at the turbine shaft aft of its compressor section, or at the forward end of the turbine shaft similar to Pratt & Whitney PW 608P and other turboprop engines. This gear set drives a lift fan clutch 124 of the drive train. As illustrated in FIG. 4, the drive train further includes a reduction gearbox 126, a cross-over drive half-shaft 128 to the opposite drive train, a lift fan drive shaft 130, and a lift fan hub 132 about which the lift fan blades 54 rotate. The power train components such as drive shaft bearings, support brackets, fasteners and other well known parts of the present invention have been omitted. The construction and additional parts are not shown since the construction would be obvious to one of ordinary skill in the art of aeronautical engineering.

Drive train clutch 124 is a multi-plate wet friction type selectively transferring torque to the reduction gearbox 126 driving the lift fan drive shaft 130 which provides torque to the lift fan hub 132 and providing the direct lift as heretofore described. Reduction gearbox is further driving the cross-over drive half-shaft 128 engaging a cross-over clutch 136 of multi-plate wet friction type mounted between the two engines.

Cross-over clutch 136 selectively engages a second cross-over half-shaft 138 driving the reduction gear box of second lift fan. Cross-over clutch 136 is engaged only when one of the two lift fan clutches 124 is disengaged. The actuator mechanism for the clutch assemblies and for throttle controls have not been shown because they are well known in the art.

Pusher propeller 120 is a normal variable pitch propeller that mobilizes the aircraft 10 of the present invention in its forward flight mode. Further, engagement of lift fan clutch 124 transfers power through the reduction gear box 126 and lift fan drive shaft 130 to the variable pitch fan lift hub 132 which causes counter-rotation of the ducted lift fans 53 and produces lift directly by mass flow of air through the duct.

Prime mover 116 can therefore engage either or both of these lift producing means. Coordination of power and variable-pitch controls on pusher propeller 120 and lift fans 53 is necessary when transitioning the present invention to and from its vertical, hovering and forward flight modes.

A controllably operable intake air scoop 134 is mounted to the exterior of the turbine air intake housing to allow more effective air intake to gas turbine when aircraft is in direct lift mode in rapid vertical ascent. At the rear of the aircraft, the vertical fin 20 has a rudder 140. Each horizontal stabilizers 18 has an elevator 142 for controlling the aircraft.

Although the invention has been described with reference to the preferred embodiment illustrated in the attached drawing figures, it is noted that substitutions may be made and equivalents employed herein without departing form the scope of the invention as recited in the claims.

What is claimed is:

1. An aircraft comprising:
    a fuselage;
    a pair of main wings secured to the fuselage, each main wing comprising:
        a lift fan segment;
        a generally circular duct defined within the lift fan segment, the duct having an upper inlet, a lower outlet and a sidewall disposed between the inlet and outlet;
        a fan mounted within the duct and rotatable therein, the fan including a plurality of blades, each blade terminating at a tip, and
        a tip extender coupled with at least one of the tips and capable of contacting the duct sidewall so that flow leakage of air between the tip of the fan and duct sidewall is reduced to increase thrust efficiency of the fan.

2. An aircraft as recited in claim 1, wherein the tip extender is biased relative to the tip.

3. An aircraft as recited in claim 2, wherein the tip extender is moveable between a first position in contact with the duct sidewall and a second position at a distance from the duct sidewall.

4. An aircraft as recited in claim 3, wherein the tip extender is biased in the direction of the sidewall by a spring.

5. An aircraft as recited in claim 1, further comprising a contact surface embedded in the duct wall that contacts the tip extender, wherein the contact surface is made of a rub material.

6. An aircraft as recited in claim 1, further comprising a plurality of tip extenders, wherein a tip extender is coupled with the tip of each blade of each fan.

7. An aircraft as recited in claim 1, further comprising a pitch control assembly forward of center of gravity of the aircraft, the pitch control assembly comprising:
    a pair of canard wings secured to the fuselage, and
    a pair of pitch control fans coupled with the fuselage proximate the canard wings.

8. An aircraft as recited in claim 7, wherein the canard wings and the pitch control fans are symmetrically disposed relative to the fuselage.

9. An aircraft as recited in claim 7, further comprising an elevator member pivotally secured to each canard wing for controlling the pitch of the aircraft when sufficient airflow passes over the canard wings and the elevators.

10. An aircraft as recited in claim 1, further comprising a number of airfoil deflectors fixedly secured to the duct walls about the upper inlet so that air is distributed air across the tips of the fan blades and thrust efficiency is increased.

11. An aircraft as recited in claim 1, further comprising an elongated duct extender coupled with the lower outlet of the circular duct, the duct extender capable of extending the effective duct depth so that lift capacity of the aircraft is increased.

12. An aircraft as recited in claim 11, wherein the duct extender includes a plurality of duct rings nestled with one another.

13. An aircraft as recited in claim 1, wherein the main wings are oriented at a dihedral angle with respect to one another so that air flow through the ducts is directed away from the aircraft fuselage.

14. An aircraft as recited in claim 13, wherein each main wing further includes a lift wing capable of folding toward the fuselage when the aircraft is on the ground.

15. An aircraft comprising:

a fuselage, and a pair of main wings secured to the fuselage, each main wing comprising:
- a lift wing segment;
- a lift fan segment;
- a generally circular duct defined within the lift fan segment and having a sidewall;
- a fan mounted within the duct and rotatable therein, the fan including a plurality of blades, and
- an elongated duct extender coupled with the lift fan segment about the circular duct, the duct extender capable of extending downward in a generally linear direction relative to the lift fan segment so that the duct depth is increased causing air drawn through the duct and duct extender to provide improved thrust of the lift fan segment.

16. An aircraft as recited in claim 15, wherein the duct extender includes a plurality of duct rings nestled with one another.

17. An aircraft as recited in claim 15, wherein the main wings are oriented at a dihedral angle with respect to one another so that airflow through the ducts is directed away from the aircraft fuselage.

18. An aircraft as recited in claim 15, wherein the position of each duct extender relative to the main wing is controlled by hydraulics.

19. An aircraft comprising:

a fuselage; and a pair of main wings secured to the fuselage, each main wing comprising:
- a lift fan segment;
- a generally circular duct defined within the lift fan segment, the duct having an upper inlet, a lower outlet and a sidewall disposed between the inlet and outlet;
- a fan mounted within the duct and rotatable therein, the fan including a plurality of blades;
- a plurality of inlet control vanes pivotally coupled with the lift fan segment about the upper inlet of the duct and rotatable to selectively restrict the flow through the duct, wherein the inlet control vanes are moveable between a closed position at which the vanes restrict the flow of air through the duct and a variety of open positions, and
- a plurality of outlet control vanes pivotally coupled with the lift fan segment about the lower outlet of the duct, wherein the outlet control vanes are rotatable to selectively restrict the flow through the duct, wherein a first number of outlet control vanes are disposed generally about the center of the outlet and a second number of outlet control vanes are disposed about the periphery of the outlet, and wherein the first number of vanes are operable independently of the second number of vanes so that the first number of outlet control vanes is capable of being closed when the second number of outlet control vanes are open to prevent a vortex ring state from being induced by the flow of air through the center of the duct.

20. An aircraft as recited in claim 19, wherein each inlet control vane includes a leading edge and a trailing edge and is shaped so that the inlet control vanes mimic the natural laminar flow airfoil of the wings.

21. An aircraft as recited in claim 20, wherein each inlet control vane is rotated about a point between the leading edge and the trailing edge so that the trailing edge of each of the vanes deflects airflow efficiently across the fan blades when inlet control vanes are open.

22. An aircraft comprising:

a fuselage;

a pair of main wings secured to the fuselage, each main wing comprising:
- a lift fan segment;
- a generally circular duct defined within the lift fan segment, the duct having a sidewall;
- a fan mounted within the duct and rotatable therein, the fan including a plurality of blades, and
- a pitch control assembly located forward of the center of gravity of the aircraft, the pitch control assembly comprising:
  - a pair of canard wings disposed generally symmetrically about the fuselage, and
  - a pair of pitch control fans disposed generally symmetrically about the fuselage and proximate the canard wings, each of the pitch control fans having a housing with a first outlet directed generally upwardly relative to the ground and a second outlet directed generally downwardly relative to the ground when the fuselage is level,
  - wherein the flow of air over the canard wings or through the outlets of the pitch control fan assists in controlling the pitch of the aircraft.

23. An aircraft as recited in claim 22, further comprising an elevator member pivotally secured to each canard wing for controlling the pitch of the aircraft when sufficient airflow passes over the canard wings and the elevators.

24. An aircraft as recited in claim 15, wherein the fan and the duct within the lift fan segment is positioned at an angle relative to a horizontal plane so that the fan directs air away from the fuselage.

25. An aircraft as recited in claim 15, further comprising at least one engine coupled with the fuselage to provide for forward flight of the aircraft.

* * * * *

UNITED STATES PATENT AND TRADEMARK OFFICE
CERTIFICATE OF CORRECTION

PATENT NO. : 6,561,456 B1
DATED : May 13, 2003
INVENTOR(S) : Devine

It is certified that error appears in the above-identified patent and that said Letters Patent is hereby corrected as shown below:

Column 1,
Lines 53 and 54, please delete "vortex-ring" and replace with -- vortex ring --.

Column 2,
Line 9, please delete "relative" and replace with -- relatively --.
Line 22, after "behind" please add -- the --.
Line 51, after "assistance from" please add -- the --.

Column 3,
Line 28, after "is" please add -- a --.
Line 34, please delete "an" and replace with -- a --.
Line 53, please delete "a".

Column 4,
Line 55, please delete "canard" and replace with -- canard wings 24 --.
Line 56, after "the pitch of" please insert -- the --.

Column 5,
Line 1, after "aircraft if" please insert -- the --.
Line 19, after "mounted to" please insert -- the --.
Line 19, after "main wing at" please insert -- the --.
Line 57, after "titanium, and" please insert -- the --.

Column 6,
Line 14, please delete the "," after "spring".

Column 7,
Line 3, please delete "with" and replace with -- within --.
Line 7, please replace "counter-vortex-ring" with -- counter-vortex ring --.
Line 11, after "73" please insert -- are shown therein --.
Line 21, after "outward from" please insert -- the --.
Line 52, please delete the "," after "well known in the art".

Column 8,
Line 30, please delete the "," after "segment".
Line 30, please delete "increase" and replace with -- increases --.
Line 37, please delete "nestlings" and replace with -- nestling --.
Line 47, after "away from" please insert -- the --.
Line 47, after "bottom of" please insert -- the --.
Line 64, after "located within" please insert -- the --.

UNITED STATES PATENT AND TRADEMARK OFFICE
CERTIFICATE OF CORRECTION

PATENT NO. : 6,561,456 B1
DATED : May 13, 2003
INVENTOR(S) : Devine

It is certified that error appears in the above-identified patent and that said Letters Patent is hereby corrected as shown below:

Column 9,
Line 29, please delete "well known" and replace with -- well-known --.
Line 44, after "gear box of" please insert -- the --.
Line 65, after "air intake to" please insert -- the --.
Line 65, after "gas turbine when" please insert -- the --.
Line 66, please delete "stabilizers" and replace with -- stabilizer --.

Column 10,
Line 4, please delete "form" and replace with -- from --.

Column 12,
Line 48, please delete "is" and replace with -- are --.

Signed and Sealed this

Seventh Day of October, 2003

JAMES E. ROGAN
*Director of the United States Patent and Trademark Office*